(12) United States Patent
Aiga et al.

(10) Patent No.: US 8,212,713 B2
(45) Date of Patent: Jul. 3, 2012

(54) OBJECT DETECTING APPARATUS

(75) Inventors: Yoshimitsu Aiga, Utsunomiya (JP);
Takeshi Sasajima, Utsunomiya (JP);
Takashi Asaba, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 308 days.

(21) Appl. No.: 12/522,884

(22) PCT Filed: Mar. 17, 2008

(86) PCT No.: PCT/JP2008/054874
§ 371 (c)(1),
(2), (4) Date: Jul. 10, 2009

(87) PCT Pub. No.: WO2008/117689
PCT Pub. Date: Oct. 2, 2008

(65) Prior Publication Data
US 2010/0090880 A1    Apr. 15, 2010

(30) Foreign Application Priority Data

Mar. 26, 2007    (JP) .............................. P2007-078790

(51) Int. Cl.
*G01S 13/04*    (2006.01)
*G01S 13/08*    (2006.01)
*G01S 13/86*    (2006.01)
G08G 1/16    (2006.01)
G01S 13/93    (2006.01)
G01S 13/00    (2006.01)

(52) U.S. Cl. ............ 342/52; 701/300; 701/301; 342/27; 342/70; 342/89; 342/94; 342/118; 342/128; 342/133; 342/146; 342/147; 342/158; 342/175; 342/176; 342/179; 342/195

(58) Field of Classification Search ................... 701/300, 701/301; 342/27, 28, 52–56, 61, 70–72, 342/118, 146, 147, 158, 175, 176, 195, 179, 342/182, 89–103, 128–133; 600/300, 407; 250/336.1, 338.1, 340, 341.1
See application file for complete search history.

(56) References Cited

U.S. PATENT DOCUMENTS

| | | | | | |
|---|---|---|---|---|---|
| 3,670,330 | A | * | 6/1972 | Riggs | 342/182 |
| 3,697,986 | A | * | 10/1972 | Colby | 342/182 |
| 4,562,439 | A | * | 12/1985 | Peralta et al. | 342/179 |
| 5,475,494 | A | | 12/1995 | Nishida et al. | |
| 5,486,832 | A | * | 1/1996 | Hulderman | 342/70 |
| 5,745,070 | A | * | 4/1998 | Yamada | 342/70 |
| 6,067,038 | A | | 5/2000 | Uehara et al. | |

(Continued)

FOREIGN PATENT DOCUMENTS

JP    5-155298 A    6/1993

(Continued)

*Primary Examiner* — Bernarr Gregory
(74) *Attorney, Agent, or Firm* — Arent Fox LLP

(57) ABSTRACT

An object detecting apparatus including: an object detecting device that causes electromagnetic waves to be reflected from an object and receives the reflected waves to detect the object while scanning a predetermined scan range; a rotating device that changes a direction of the object detecting device; an imaging device that captures images; a display device that displays an image captured by the imaging device; a setting device that sets the scan range of the object detecting device on the image displayed by the display device; and a control device that instructs the rotating device to rotate the object detecting device based on the set scan range, and instructs the object detecting device to scan the scan range.

4 Claims, 4 Drawing Sheets

U.S. PATENT DOCUMENTS

| | | | |
|---|---|---|---|
| 6,323,802 B1 * | 11/2001 | Tokoro | 342/70 |
| 6,422,508 B1 * | 7/2002 | Barnes | 342/52 |
| 6,744,399 B2 * | 6/2004 | Tohyama et al. | 342/70 |
| 6,795,014 B2 * | 9/2004 | Cheong | 342/118 |
| 6,870,162 B1 * | 3/2005 | Vaidya | 250/341.1 |
| 6,878,939 B2 * | 4/2005 | Vaidya | 250/336.1 |
| 6,900,438 B2 * | 5/2005 | Vaidya et al. | 250/336.1 |
| 7,075,080 B2 * | 7/2006 | Vaidya | 250/336.1 |
| 7,132,976 B2 * | 11/2006 | Shinoda et al. | 342/70 |
| 7,176,830 B2 * | 2/2007 | Horibe | 342/70 |
| 2004/0080449 A1 | 4/2004 | Horibe | |
| 2005/0251018 A1 * | 11/2005 | Gleman | 600/407 |
| 2006/0125679 A1 * | 6/2006 | Horibe | 342/52 |
| 2006/0274149 A1 | 12/2006 | Yoshizawa | |

FOREIGN PATENT DOCUMENTS

| | | |
|---|---|---|
| JP | 6-293236 A | 10/1994 |
| JP | 06-294870 A | 10/1994 |
| JP | 2001-155291 A | 6/2001 |
| JP | 2005-82124 A | 3/2005 |
| JP | 2006-221498 A | 8/2006 |
| JP | 2006-323693 A | 11/2006 |
| JP | 2007-15676 A | 1/2007 |

* cited by examiner

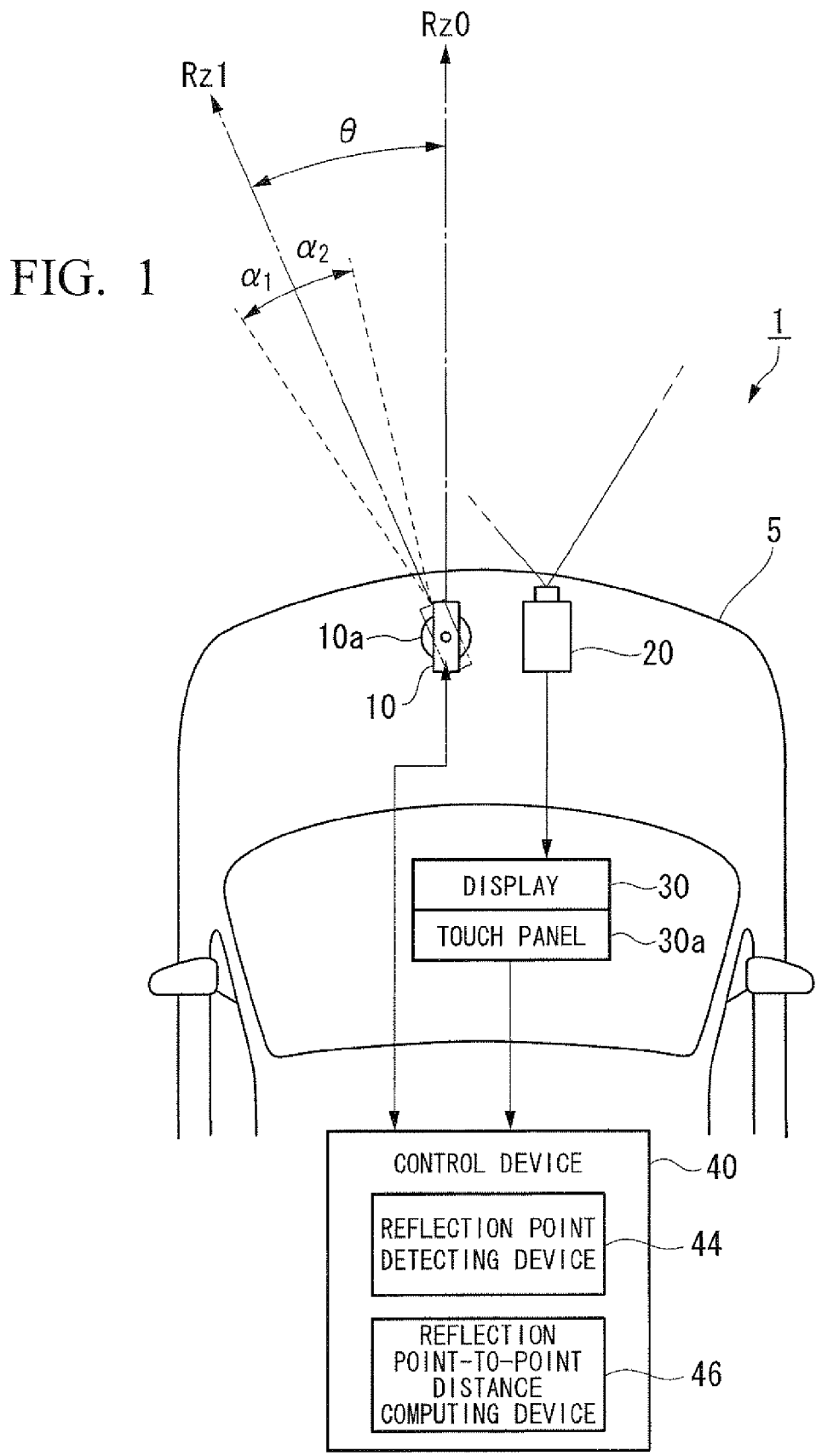

OBJECT DETECTING APPARATUS

TECHNICAL FIELD

The present invention relates to an object detecting apparatus.

Priority is claimed on Japanese Patent Application No. 2007-078790, filed Mar. 26, 2007, the content of which is incorporated herein by reference.

BACKGROUND ART

A technique is proposed in which a radar is mounted on a vehicle to detect objects in its surroundings (for example, refer to Patent Document 1).

Patent Document 1: Japanese Unexamined Patent Application, First Publication No. H06-294870

DISCLOSURE OF INVENTION

Problems to be Solved by the Invention

It is hoped that techniques will be developed whereby the distance between a plurality of objects is measured using a radar mounted on a vehicle, to determine if it is possible for the vehicle itself to pass through.

However, the scan range of a laser radar or a millimeter wave radar that can be mounted on a vehicle is typically small, so that it is not possible to detect objects in a wide range using the radar.

If a radar with a wide scan range is used, since it takes time to scan the whole range, the time until an object is detected becomes long. Furthermore, it is difficult from the view of cost, to install two types of radar, namely one with a narrow angular range and one with a wide angular range.

Moreover, realizing wide angle scanning by rotating the laser in addition to the scanning of the laser itself can be considered. In this case, it is necessary to rotate the laser to the central location of the scan range, which is the target. However, since the scanning location of the laser cannot directly be seen visually, it is difficult to rotate the laser to the central location of the scan range manually.

Therefore, the present invention has an object of providing an object detecting apparatus that can detect an object in an arbitrary range, and obtain the distance between a plurality of objects.

Means for Solving the Problem

In order to solve the above problem, the present invention employs the following. That is, an object detecting apparatus according to the present invention includes: an object detecting device that causes electromagnetic waves to be reflected from an object and receives the reflected waves to detect the object while scanning a predetermined scan range; a rotating device that changes a direction of the object detecting device; an imaging device that captures images; a display device that displays an image captured by the imaging device; a setting device that sets the scan range of the object detecting device on the image displayed by the display device; and a control device that instructs the rotating device to rotate the object detecting device based on the set scan range, and instructs the object detecting device to scan the scan range.

According to the above-described object detecting apparatus, since it has a rotating device that changes the direction of the object detecting device, then even in the case where an object detecting device with a narrow scan range is used, it is possible to detect objects in an arbitrary range. Furthermore, since it has a setting device that sets the scan range of the object detecting device on the image displayed, it is possible to set the scan range easily according to the intention of an operator. Moreover, since it has a control device that instructs the rotating device to rotate the object detecting device, and instructs the object detecting device to scan the scan range, then even if the scanning location of the object detecting device cannot be seen visually, it is possible to rotate the object detecting device with respect to the set scan range automatically, and scan.

It may be arranged such that the object detecting apparatus further includes: a reflection point detecting device that detects a plurality of reflection points of the reflected waves from locations at a predetermined distance from the imaging device, based on a detection result of the object detecting device; and a reflection point-to-point distance computing device that calculates a distance between the plurality of reflection points.

In this case, it is possible to calculate the distance between the plurality of reflection points to obtain the distance between the plurality of objects.

It may be arranged such that the control device determines whether or not the distance calculated by the reflection point-to-point distance computing device is greater than a predetermined value, and instruct the display device to display the result.

In this case, the operator can determine at a glance whether or not the calculated distance is greater than the predetermined value.

It may be arranged such that the control device instructs the rotating device to rotate the object detecting device so that a center of the scan of the object detecting device matches a center of the scan range set by the setting device.

In this case, even in the case where an object detecting device with a narrow scan range is employed, it is possible to detect objects in a desired range reliably.

Effects of the Invention

According to the object detecting apparatus of the present invention, it is possible to detect objects in an arbitrary range, and obtain the distance between a plurality of objects. Furthermore, when detecting the objects, it is possible to set a scan range easily, and automatically scan the set scan range.

BRIEF DESCRIPTION OF THE DRAWINGS

FIG. 1 is a schematic block diagram of an object detecting apparatus according to an embodiment.

DESCRIPTION OF THE REFERENCE SYMBOLS

Figure 2A:
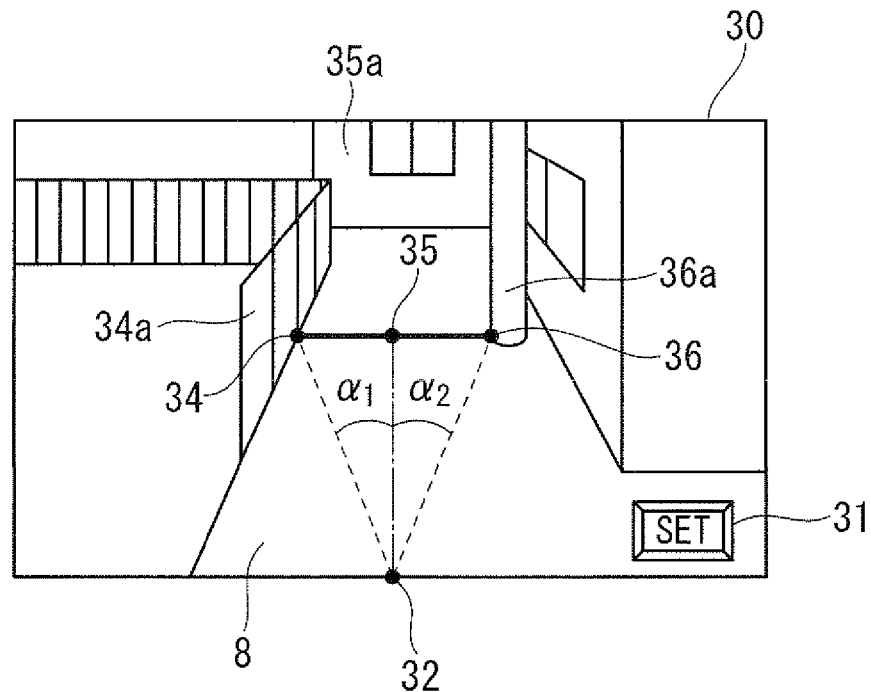
FIG. 2A is an example of an image displayed by a display device.

1 Object Detecting Apparatus
10 Radar (Object Detecting Device)
10a Motor (Rotating Device)
20 Camera (Imaging Device)
30 Display (Display Device)

30a Touch Panel (Setting Device)
40 Control Device
44 Reflection Point Detecting Device
46 Reflection Point-To-Point Distance Computing Device

BEST MODE FOR CARRYING OUT THE INVENTION

Hereunder is a description of an embodiment of the present invention, with reference to the drawings.
(Object Detecting Apparatus)
FIG. 1 is a schematic block diagram of an object detecting apparatus according to the present embodiment. An object detecting apparatus 1 according to the present embodiment is mounted on a vehicle 5, and is provided with: a radar (object detecting device) 10 that receives reflected waves from an object to detect the object by scanning a predetermined scan range using electromagnetic waves; a camera (imaging device) 20 that captures images; a display (display device) 30 that displays an image captured by the camera 20; a touch panel (setting device) 30a that sets the scan range of the radar 10 on the image displayed on the display 30; and a control device 40 that instructs the radar 10 to scan the set scan range.

The radar 10, such as a laser radar, a millimeter wave radar, or the like, is mounted on the front of the vehicle 5. The radar 10 is provided with a transmitting section that transmits electromagnetic waves and a receiving section that receives reflected waves. The transmitting section can scan a predetermined angular range ($-\alpha 2$ to $+\alpha 1$) while transmitting electromagnetic waves forward. The receiving section receives reflected waves that are transmitted from the transmitting section and reflected from objects.

The radar 10 is mounted on a motor 10a. The motor 10a is constituted by a stepper motor or the like, and the rotation shaft is arranged in the vertical direction. The motor 10a mounted on the rotation shaft can rotate in the horizontal plane. In FIG. 1, the radar 10 rotates only by a rotation angle $\theta$ from the vehicle front direction (Rz0 direction), to face in the Rz1 direction. The radar 10 can scan the range of the scanning angle between $-\alpha 2$ and $+\alpha 1$, centered on the Rz1 direction, using electromagnetic waves.

The camera 20 such as a CCD camera or the like, is mounted on the front of the vehicle 5. The camera 20 captures images ahead of the vehicle.

The display 30 that displays the images captured by the camera 20 is mounted in the compartment of the vehicle 5. A transparent touch panel 30a that can recognize a pressed location, is placed on the surface of the display 30. As a result, by pressing the range that the operator wants to scan, on the image displayed on the display 30, it is possible to set the scan range of the radar 10.

In order to control the operation of the above-mentioned components, a control device 40 is incorporated in an on-board computer or the like. The control device 40 calculates the rotation angle $\theta$ and the scanning angle $-\alpha 2$ to $+\alpha 1$ of the radar 10, based on the set scan range of the radar 10. To be specific, it calculates the rotation angle $\theta$ of the radar 10 from the coordinates of the central point of the scan range, and calculates the scanning angle $-\alpha 2$ to $+\alpha 1$ of the radar 10 from the coordinates of the two end points of the scan range. Then it rotates the radar 10 by the calculated rotation angle $\theta$, and also scans the range of the scanning angle $-\alpha 2$ to $+\alpha 1$ using electromagnetic waves.

Furthermore, the control device 40 is provided with a reflection point detecting device 44 that detects reflection points of the reflected waves from locations at a predetermined distance from the camera 20. The reflection point detecting device 44 detects a plurality of reflection points existing at a predetermined distance from the camera 20.

Moreover, the control device 40 is provided with a reflection point-to-point distance computing device 46 that calculates the distance between a plurality of reflection points. The distance between the plurality of reflection points corresponds to the gap between the plurality of objects existing ahead of the vehicle.

Furthermore, the control device 40 compares the distance between the calculated reflection points and the vehicle width of the vehicle itself registered in advance, and determines whether or not the vehicle itself can pass between the objects. Then, the control device 40 displays the calculated distance between the objects and the determination result of whether or not it can pass through, on the display 30. Moreover, the control device 40 displays the predetermined distance on the display 30 as the distance to the objects.
(Object Detecting Method)
Next is a description of a method of detecting objects using the object detecting apparatus according to the present embodiment.

First, an image ahead of a vehicle is captured by the camera 20, and the captured image is displayed on the display 30.

FIG. 2A is an example of an image displayed on the display device. A set button 31 for a vehicle pass detection range is situated at a corner of the image on the display 30. An occupant of the vehicle presses the set button 31 to set a detection range (that is, the scan range of the radar 10) for determining whether or not the vehicle can pass through. The detection range is set by specifying the detection range on the image using the finger of the occupant. As described above, since the transparent touch panel 30a is placed on the surface of the display 30, the detection range is set by pressing the touch panel 30a. The concerned range may be specified by pressing only the start point 34 and the end point 36 of the detection range. Furthermore, the concerned range may be specified by pressing from the start point 34 to the end point 36 in a straight line. In the example of FIG. 2A, with a wall 34a on the left side of a road surface 8 as the start point 34, and a utility pole 36a on the right side as the end point 36, the road surface 8 between the two is set as the detecting range for determining whether or not the vehicle can pass through.

Next, the control device 40 calculates the coordinates on the screen (referred to hereunder as "screen coordinates"), of the central point 35 of the detection range. The screen coordinates of the central point 35 can be calculated from the screen coordinates of the start point 34 and the end point 36 of the detection range. Next, the control device 40 calculates the distance from the camera 20 to the central point 35 of the detection range.

Figure 3:
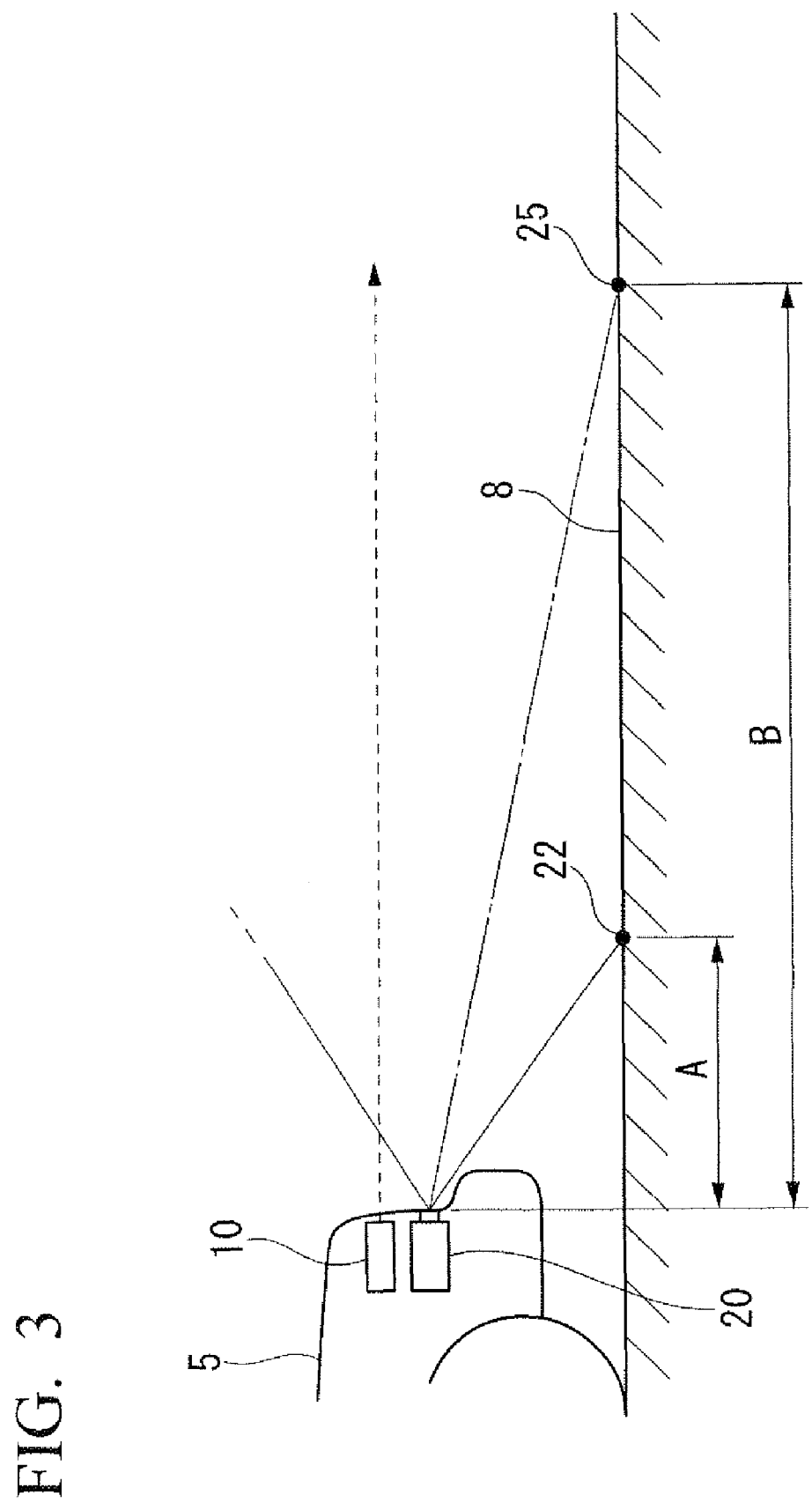
FIG. 3 is an explanatory diagram of a method of calculating a distance from a camera fixed in a vehicle to a central point of a detection range.

FIG. 3 is an explanatory diagram of a method of calculating the distance to the central point of the detection range, being a side view ahead of the vehicle. When the road surface 8 is captured by the camera 20 fixed in the vehicle, a distance A from the camera 20 to a point 22 on the road surface corresponding to the base point 32 of the image is constant. In this manner, the screen coordinates of a specific point on the road surface image, and the distance to the point 22 on the road surface corresponding to the screen coordinates, correspond one to one. Accordingly, if the screen coordinates of the central point 35 are known, it is possible to obtain a distance B to a point 25 on the road surface corresponding to the central point 35.

Next, the control device 40 calculates a rotation angle $\theta$ of the radar 10 from the coordinates of the central point 35 of the detection range on the screen as shown in FIG. 2A ($\theta=0$ in the example of FIG. 2A). Since the camera 20 is fixed on the vehicle, the direction corresponding to the center of the screen is the Rz0 direction of FIG. 1, and the direction corresponding to the central point 35 of the detection range is the Rz1 direction of FIG. 1. Accordingly, the angle made by Rz0 and Rz1 can be obtained from the screen coordinates of the center of the screen and the screen coordinates of the central point 35, so that the rotation angle of the radar 10 can be calculated.

Next, the control device 40 determines the scanning angle $-\alpha 2$ to $+\alpha 1$ of the radar 10 from the screen coordinates of the start point 34 and the end point 36 of the detection range as shown in FIG. 2A. To be specific, the angle $\alpha 1$ made by the direction corresponding to the central point 35 and the direction corresponding to the start point 34 of the detection range is obtained from the screen coordinates of the central point 35 and the screen coordinates of the start point 34. Similarly, the angle $\alpha 2$ made by the direction corresponding to the central point 35 and the direction corresponding to the end point 36 of the detection range is obtained from the screen coordinates of the central point 35 and the screen coordinates of the end point 36.

The control device 40 drives the motor 10a to rotate the radar 10 based on the calculated rotation angle $\theta$. Next, the control device 40 drives the radar 10. The radar 10 transmits electromagnetic waves parallel to the road surface, and receives reflected waves from objects. Based on the time from transmission to reception, the distances to the objects are detected. Furthermore, the control device 40 instructs the radar to scan based on the calculated scanning angle $-\alpha 2$ to $+\alpha 1$.

Figure 2B:
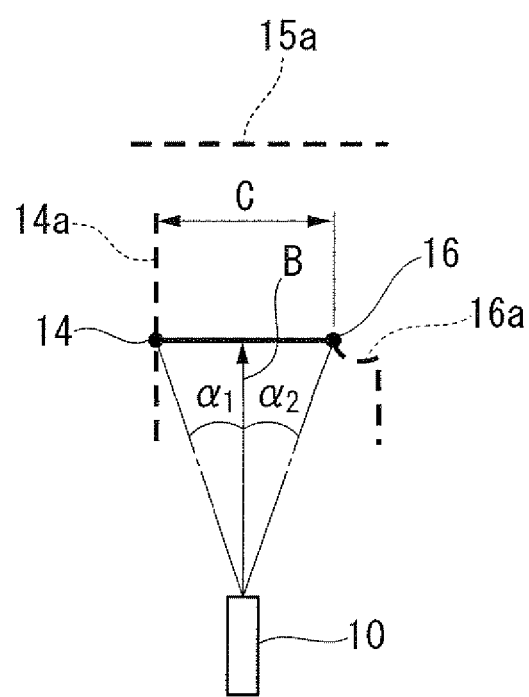
FIG. 2B is a plan view of results of object detection by a radar.

FIG. 2B is a plan view of the object detection results from the radar. In FIG. 2B, the locations of objects detected outside of the range of the scanning angle $-\alpha 2$ to $+\alpha 1$ are indicated by broken lines. By scanning by the radar 10, as shown in FIG. 2B, a wall 14a on the left side, a wall 15a at the center rear, and a utility pole 16a on the right side are detected at fixed locations.

Next, the reflection point detecting device 44 shown in FIG. 1 detects a plurality of reflection points of the reflected waves from locations at a predetermined distance B from the camera 20, based on the detection results of the radar 10. In the present embodiment, since the camera 20 and the radar 10 are installed at the same height, reflection points from locations at a predetermined distance B from the radar 10 are detected. The predetermined distance B is the distance from the radar 10 to the detection range, and it is possible to employ the distance to the central point of the detection range as a representative. In the example of FIG. 2B, the reflection point 14 on the wall 14a and the reflection point 16 on the utility pole 16a are detected as reflection points separated from the radar 10 to the front of the vehicle by the distance B.

Next, the reflection point-to-point distance computing device 46 as shown in FIG. 1 calculates the distance between the plurality of reflection points. In the example of FIG. 2B, the distance C between the reflection point 14 on the wall 14a and the reflection point 16 on the utility pole 16a is calculated. The distance C between the two corresponds to the distance between the wall 14a and the utility pole 16a.

Next, the control device 40 as shown in FIG. 1 compares the distance C between the reflection points calculated by the reflection point-to-point distance computing device 46 with the vehicle width of the vehicle itself registered in advance, and determines whether or not the vehicle itself can pass between the objects. If the distance C between the reflection points is greater than the vehicle width, it determines that it is possible to pass through, and if it is smaller that the vehicle width, it determines that it is not possible to pass through.

Next, the control device 40 displays the determination results and the like of whether or not it is possible to pass through, on the display device.

Figure 4:
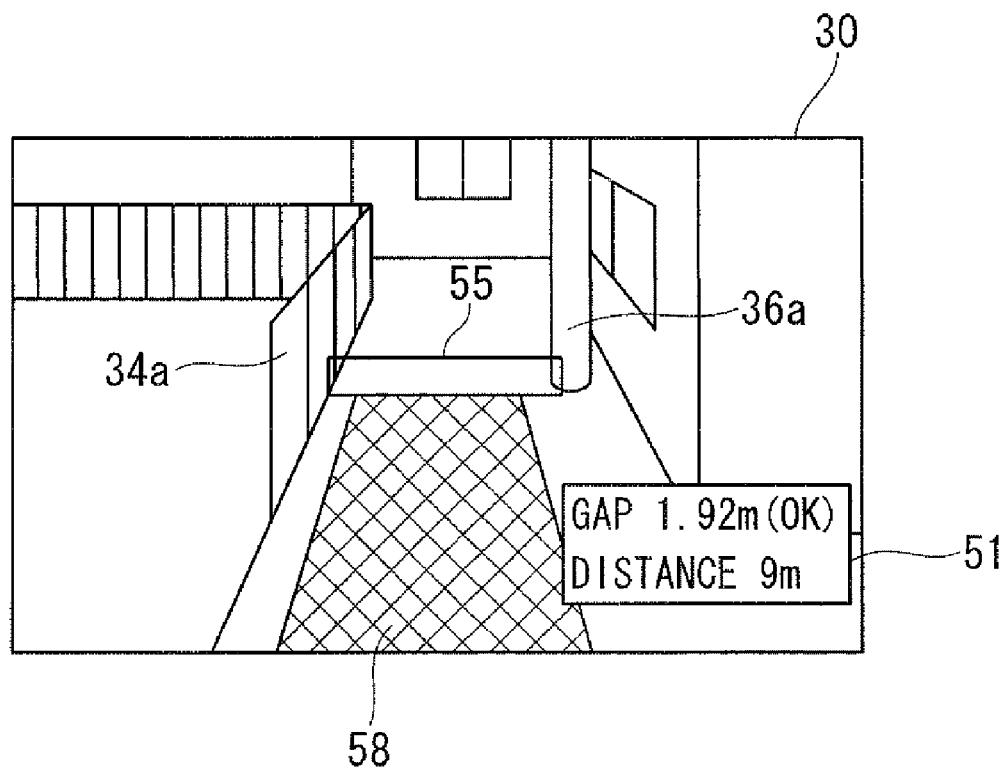
FIG. 4 is an example of a screen on which determination results and the like are displayed.

FIG. 4 is an example of a screen on which the determination results and the like are displayed. A display section 51 that displays the determination results and the like from the control device 40 is provided at the corner of the screen of FIG. 4. The display section 51 displays the distance between the objects, the determination result of whether or not it is possible to pass through, and the distance to the objects. To be specific, the distance between the wall 34a and the utility pole 36a is displayed as "Gap 1.92 m", the determination result of whether or not the vehicle itself can pass through is displayed as "OK", and the distance from the camera to the central point of the detection range is displayed as "Distance 9 m".

Furthermore, in the image of FIG. 4, a highlighted display section 55 is provided in which the range set by the occupant for detecting whether or not it is possible to pass through, is displayed in a frame or a band. As a result it can be determined at a glance to which area the display of; the distance between the objects, the determination result of whether or not it is possible to pass through, and the distance to the objects, is related. Moreover, a line display section 58 is provided in which lines corresponding to the vehicle width are displayed from the detection range for whether or not passing through is possible, down to the bottom of the screen. Thereby it is possible to determine at a glance the ratio of the width between the objects and the vehicle width. As a result, the occupant can to estimate the degree of difficulty of passing through.

As described in detail above, the object detecting apparatus 1 according to the present embodiment is provided with: the radar 10 that receives reflected waves from an object to detect the object by scanning a predetermined scan range using electromagnetic waves; the motor 10a that changes the direction of the radar 10; the camera 20 that captures images; the display 30 that displays an image captured by the camera 20; the touch panel 30a that sets the scan range of the radar 10 on the image displayed on the display 30; and the control device 40 that instructs the motor 10a to rotate the radar 10 based on the scan range, and instructs the radar 10 to scan the scan range.

According to the above-described object detecting apparatus 1, since there is provided the motor that changes the direction of the radar 10, then even in the case where a radar 10 with a narrow scan range is used, it is possible to detect objects in an arbitrary range. Furthermore, since there is provided the touch panel 30a that sets the scan range of the radar 10 on the image displayed, it is possible to set the scan range easily according to the intention of the occupant. Moreover, since there is provided the control device 40 that instructs the motor 10a to rotate the radar 10 based on the set scan range, and instructs the radar 10 to scan the scan range, then even if the scanning location of the laser cannot be observed visually, it is possible to rotate the radar 10 with respect to the set scan range automatically, to scan the scan range.

Furthermore, the object detecting apparatus 1 according to the present embodiment is provided with the reflection point detecting device 44 that detects a plurality of reflection points of the reflected waves from locations at a predetermined distance from the camera 20, based on the detection results of the radar 10, and the reflection point-to-point distance computing device 46 that calculates the distance between the plurality of reflection points.

According to the object detecting apparatus 1, it is possible to calculate the distance between the plurality of reflection points to obtain the distance between a plurality of objects. As a result it is possible to determine whether or not it is possible for the vehicle itself to pass between the objects.

Moreover, in the object detecting apparatus 1 according to the present embodiment, the control device 40 determines whether or not the distance between the plurality of reflection points calculated by the reflection point-to-point distance computing device 46 is greater than the vehicle width of the vehicle itself, and displays the result on the display 30.

In this case, the occupant can determine at a glance of the display 30 whether or not the distance between the calculated reflection points is greater than the vehicle width of the vehicle itself.

Furthermore, in the object detecting apparatus 1 according to the present embodiment, the control device 40 rotates the radar 10 so that the scanning center of the radar 10 matches the center of the scan range set using the touch panel 30a. In this case, even in the case where a radar 10 with a narrow scan range is used, it is possible to detect objects in a desired range reliably.

The present invention is not limited to the above-described embodiment.

For example, indication of the distances to objects, the gaps between the objects, and the determination result of whether or not it is possible to pass through, are not limited to display on a screen. They may be displayed in other places, and may be indicated by sound. Moreover, the above-described display items are one example. Some of the display items may be removed, and other display items may be added.

INDUSTRIAL APPLICABILITY

An object detecting apparatus can be provided in which objects can be detected in an arbitrary range, and the distance between a plurality of objects can be obtained.

The invention claimed is:

1. An object detecting apparatus comprising:
    an object detecting device that causes electromagnetic waves to be reflected from an object and receives the reflected waves to detect said object while scanning a predetermined scan range;
    a rotating device that rotates said object detecting device;
    an imaging device that captures images;
    a display device that displays an image captured by said imaging device;
    a setting device that sets said scan range of said object detecting device on the image displayed by said display device; and
    a control device that instructs said rotating device to rotate said object detecting device based on the set scan range, and instructs said object detecting device to scan said scan range.

2. The object detecting apparatus according to claim 1, further comprising:
    a reflection point detecting device that detects a plurality of reflection points of said reflected waves from locations at a predetermined distance from said imaging device, based on a detection result of said object detecting device; and
    a reflection point-to-point distance computing device that calculates a distance between said plurality of reflection points.

3. The object detecting apparatus according to claim 2, wherein said control device determines whether or not said distance calculated by said reflection point-to-point distance computing device is greater than a predetermined value, and instructs said display device to display the result.

4. The object detecting apparatus according to claim 1, wherein said control device instructs said rotating device to rotate said object detecting device so that a center of the scan of said object detecting device matches a center of said scan range set by said setting device.

* * * * *